UNITED STATES PATENT OFFICE.

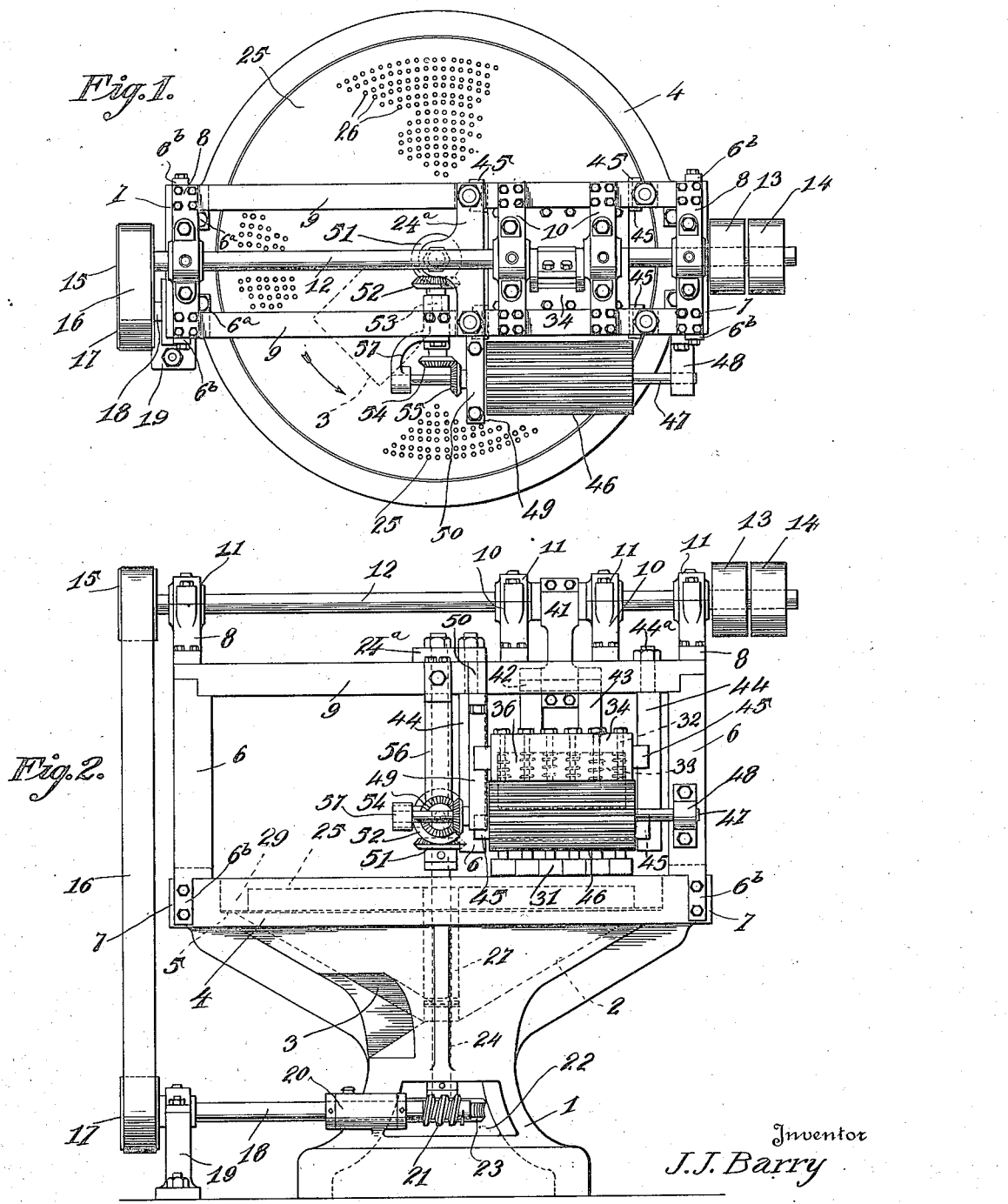

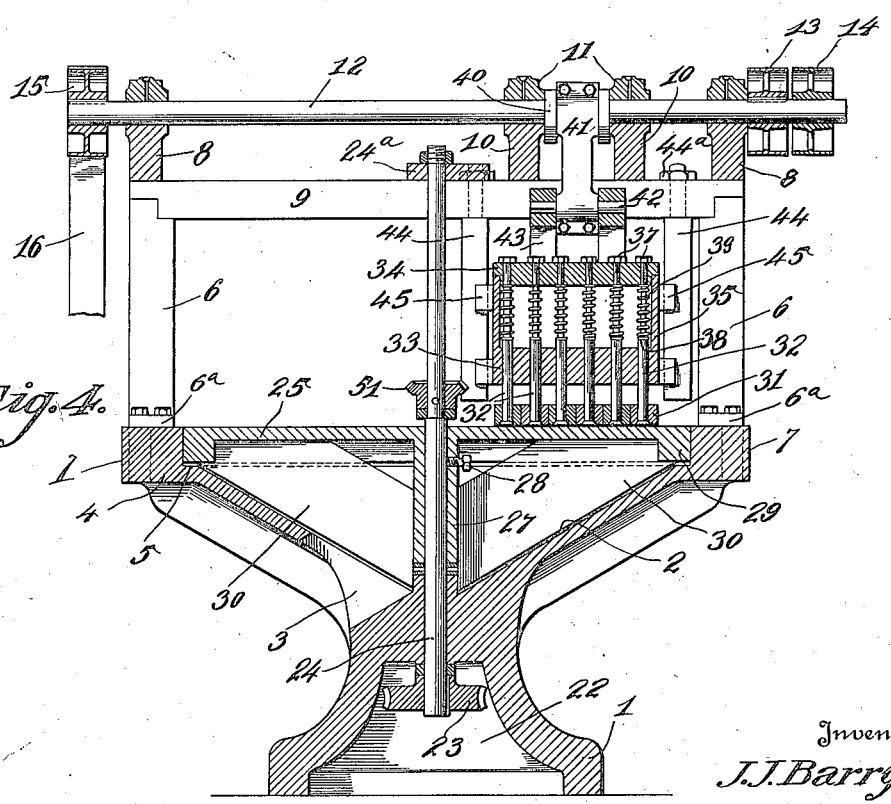

JAMES J. BARRY, OF EAST BOSTON, MASSACHUSETTS, ASSIGNOR TO L. PICKERT FISH COMPANY, OF EAST BOSTON, MASSACHUSETTS, A CORPORATION OF MAINE.

MACHINE FOR SEPARATING FLESH FROM THE SKIN AND BONES OF FISH.

1,415,296. Specification of Letters Patent. Patented May 9, 1922.

Application filed November 12, 1921. Serial No. 514,740.

*To all whom it may concern:*

Be it known that I, JAMES J. BARRY, a citizen of the United States, residing at East Boston, in the county of Suffolk and State of Massachusetts, have invented certain new and useful Improvements in Machines for Separating Flesh from the Skin and Bones of Fish; and I do hereby declare the following to be a full, clear, and exact description of the invention such as will enable others skilled in the art to which it appertains to make and use the same.

This invention relates to machines for separating the flesh from the skin and bones of fish.

The object of the invention is to rapidly and efficiently separate the flesh in small particles from the skin and bones by pressing the soft flesh through a perforated travelling septum leaving the tougher and harder skin and bones on the septum, from which they may be readily removed.

In order to achieve the object of the invention I have devised a machine comprising a suitable base supporting a hopper, a perforated septum over the hopper and a movable, yieldable presser device which engages the fish between it and the septum and forces the flesh through the perforations into the hopper from which it may be removed. The machine also comprises various subcombinations as more fully set forth in the ensuing description and particularly pointed out in the claims.

In the accompanying drawings, in which similar reference characters designate like parts throughout the several views;

Figure 1 is a plan of my improved mechanism viewed from above;

Figure 2 is a side elevation thereof;

Figure 3 is an elevation viewed at right angles to the elevation shown in Figure 2 but with the main driving pulley removed;

Figure 4 is a central vertical section through the machine.

In the embodiment of the invention illustrated numeral 1 indicates any suitable base which may be mounted upon a floor or other foundation to support the principal parts of the machine. The upper surface of the base may have a cavity constituting a hopper 2, preferably in the shape of an inverted cone, said hopper having a discharge opening 3 extending laterally through the wall of the base. In the form shown the upper portion of the base is of circular outline and is provided with an annular flange 4 enclosing an annular rabbet 5 adapted to accommodate the edge of a rotary, disk-like, perforated septum to be presently described. Rising from opposite points on the edge of the base are standards 6, there being two standards at each side, spaced equally from the ends of a diametrical line intersecting the base; the base, at the points where the standards project upward having projections 7 of a size to afford ample material for securing thereto the lower ends of said standards 6, each standard having two flanges 6$^a$ and 6$^b$ bolted respectively to the top and one side of the projection 7. The upper ends of each pair of standards are connected by bearing hangers 8, while the upper ends of corresponding standards of each pair are tied together by beams 9, each extending at right angles to the hangers 8 in a plane equally spaced from the perpendicular diametrical plane intersecting the center of the base. Intermediate the bearing hangers 8 are other similar bearing hangers 10, both disposed at one side of the center of the base. Said bearing hangers 8 and 10 have shaft bearings formed in them in alinement with each other and each hanger is provided with a suitable bearing cap 11.

Journaled in the bearings of said hangers is a main shaft 12 having at one end a fast pulley 13 and a loose pulley 14, said shaft 12 being adapted to be rotated by a belt extending from a line shaft or a suitable prime mover (not shown) to the pulley 13. That end of the shaft 12 which projects through the hanger 8 on the side opposite from that which carries the pulleys 13 and 14 is provided with a pulley 15 fixed thereto over which a belt 16 extends to a pulley 17 secured to the extremity of a counter shaft 18 disposed parallel with shaft 12 but extending to one side of the center of the base. The counter shaft 18 may be journaled in suitable bearings 19 and 20. In the present embodiment the bearing 20 is shown as carried on the base 1. On the end of shaft 18 opposite the pulley 17 is secured a worm 21. The bottom of the base 1 may be hollow, as indicated at 22 in order to provide space for a worm wheel 23, secured to a vertical shaft 24. On the side adjacent the worm 21 the said base may be provided with an opening in order that the worm 21 may properly mesh with said worm wheel 23 rigidly connected to the lower end of said shaft 24 which extends vertically through the center of the base and the upper end of which is journaled in a bracket 24ª bridged across the beams 9 as best shown in Figure 1.

Rigidly secured to the shaft 24 is a perforated separating septum 25 in the form of a flat topped disk having numerous closely placed perforations 26 therethrough and having a central hub 27 which surrounds the shaft 24 and through which a set screw 28 may be threaded in order to secure the disk 25 firmly to shaft 24. An annular rim 29 is formed on the under side of the disk 25 at its outer edge, said rim 29 fitting with reasonable snugness within the circular rabbet 5 formed in the base 1. Scraping blades 30 are adapted to rotate within the hopper 2 in order to carry around with them particles of fish that have been pressed through the perforations of the disk 25 by mechanism to be described. These scrapers 30 carry the fish around until it comes opposite the opening 3 through which it descends by gravity being caught by any suitable receptacle placed in position to receive it. The scrapers 30 may be formed as a part of the rotary septum 25 or they may be secured to it and the hub 27. There may be any suitable number of such scrapers; preferably four, spaced 90° apart.

In order to disintegrate the fish and press the fleshy parts through the perforations 26 of the septum 25 I have devised a reciprocating presser device made up of a plurality of presser surfaces each of which may yield independently of the others, said presser device being caused to move positively as a whole. By this construction every part of the fish is suitably acted upon by the presser device, each separate area thereof descending toward the upper surface of the septum as far as the bones or harder portions of the fish will permit. In the embodiment illustrated the said presser device consists of a plurality of plungers, each plunger consisting of a rectangular head 31 attached to a stem 32. The said stems 32 are slidably mounted in the lower and upper walls 33 and 34 of a box-like cross head having four sides such as 35 and 36. The upper ends of the stems 32, which project above the upper wall 34 of the cross head, are threaded so that nuts 37 may be secured to them in order to prevent the plungers from protruding too far beneath the lower wall 33 of the cross head. The nuts 37 may be adjusted so that the lower surfaces of the plunger heads 31 may be brought into the same plane if desired. The upper portions of the plunger stems 32 are reduced in size so as to form shoulders 38. A coiled spring 39 surrounds each of said stems above the shoulder 38, one end of each spring bearing upon a shoulder 38, while the other end bears against the under side of the top wall 34. By this construction each section of the flexible compressor surface may yield independently of the others whereby some of the plungers may descend further than others that may be obstructed by the thick heavy bones of the fish, thus insuring that all of the fleshy part of the fish shall be forced through the orifices in the separating septum 25. The rectangular heads 31 are preferably arranged closely side by side, in substantial contact. Their lower faces are preferably knurled or otherwise roughened in order that the fish may be prevented from slipping when engaged by the plungers. The cross head may be reciprocated by an eccentric or crank pin 40 formed on or connected to the shaft 12 between the bearing hangers 10. Connected to the eccentric 40, as shown, is a pitman 41, preferably divided longitudinally for ease in connecting it to the eccentric 40 and wrist pin 42, said pin 42 extending between two lugs or ears 43 secured to the upper side of the cross head. The cross head may be guided in its vertical reciprocations by any suitable guiding means, such as the four depending guide members 44 which may be securely bolted to the cross beams 9 as indicated at 44ª. Suitable guide lugs 45 formed on or connected to the side members 35 of the box-like cross head embrace said guides 44 whereby the cross head may be constrained to reciprocate vertically in right lines.

In order to feed the fish positively into the area of action of the presser device a driven feed roll or equivalent device is mounted at one side of the presser device. As indicated in Figure 1, a feed roll 46 is carried on a shaft 47 one end which is journaled in a bracket 48 projecting laterally from one of the uprights 6. Said shaft 47, where it projects from the other end of the feed roll 46, is journaled in a bracket 49 the upper end of which is bolted firmly to a lateral member 50 extending from one of the beams 9. The said feed roll 46 is spaced a suitable distance above the surface of the disk 25 and is preferably fluted or otherwise indented so that it may firmly engage a fish between it and the rotary disk thus causing the fish to advance into position to have the flesh separated from the skin and bones by the action of the said presser device. The surface speed of said feed roll 46 may be approximately that of the surface speed of the movable septum 25 and the adjacent surfaces of said feed roll and septum should move in the same direction.

In order to rotate the feed roll 46 a train of gearing extends from the described central shaft 24 to the feed roll shaft 47 which is as follows: Secured to the shaft 24 a little above the septum 25 is a mitre gear 51. Meshing with the mitre gear 51 is a mitre gear 52 secured to one end of a short transverse shaft 53 on the other end of which is a fixed mitre gear 54 meshing with a mitre gear 55 secured to said shaft 47. Any suitable bearing bracket may be provided for the transverse shaft 53 such as a bracket 56 bolted to one of the beams 9 and depending as indicated in Figure 2. A curved arm 57 may, if desired, extend from said bearing for the shaft 53 in order to form a steadying support for the extremity of the shaft 47.

When power is applied to the machine described the shaft 12 will be rotated by a belt engaging the fast pulley 13. From the shaft 12 motion will be imparted to counter shaft 18, and worm 21 on the extremity of said shaft engaging worm wheel 23 will rotate shaft 24 at a speed much reduced with respect to the speed of the shaft 12. The rotary movement of the shaft 24 will be imparted to the septum disk 25 which therefore travels horizontally beneath the presser device while the feed roll 46 will also be rotated in a direction proper to feed, in co-operation with the disk 25, a fish placed beneath the roll, to and beneath the yielding reciprocating presser member, which, reciprocating at a relatively high speed, quickly applies a rapid succession of yielding impacts or pressures to all portions of the fish, sufficient in degree to force the softer fleshy portions through the orifices 26 into the hopper 2. The particles of fish accumulating in the hopper 2 are carried around by the scraper blades 30 and discharged through the discharge opening 3 where they may be caught by any suitable means and removed. The skin and bones left after the fish has been subjected to the separating action remain on the travelling septum and may be continuously removed from the segment exposed as shown at the upper margin of Figure 1. Although no automatic devices are shown for removing the skin and bones it will be apparent that suitable scrapers or other devices may be applied so that the skin and bones may be removed automatically. In so far as this invention is concerned it is assumed that they are removed by hand or with the aid of suitable hand tools.

In practice this machine is designed to operate upon fresh or undried fish, such as haddock, the head and entrals of which have been removed. The fish thus treated may be fed by hand into the space between the feed rolls and the travelling septum, which is sufficient to admit a fish of the size desired to be treated but to press the fish firmly toward the septum so that it will be positively advanced beneath the reciprocating presser device.

It will be understood that the invention has been illustrated in the form now best known to me but that the principle thereof may be embodied in other specific forms of mechanism and that the invention is not to be limited otherwise than by the definition of the appended claims.

Having described my invention in such manner as to enable those skilled in the art to make and use the same what I claim and desire to secure by Letters Patent is:

1. In means for separating the flesh of fish from the skin and bones thereof, the combination of a travelling perforated septum, means for pressing the fish against said septum, means for reciprocating said pressing means toward and from said septum, and a yielding connection between said presser means and said means for reciprocating it.

2. In means for separating the flesh of fish from the skin and bones thereof, the combination of a travelling perforated septum, and a movable presser means co-operating therewith, said presser means comprising a surface composed of a plurality of independently yieldable sections.

3. In means for separating the flesh of fish from the skin and bones thereof, the combination of a travelling perforated septum, means for pressing the fish against said septum, comprising a plurality of plungers, means for reciprocating said plungers toward and from said septum, and a spring disposed between each plunger and said reciprocating means.

4. In means for separating the flesh of fish from the skin and bones thereof, the combination of a travelling perforated septum, means for pressing the fish against said septum, comprising plungers, means for reciprocating said plungers comprising a suitably guided cross head in which said plungers are slidably mounted, springs tending to project said plungers from the cross head toward the septum, and an eccentric for operating the cross head.

5. In means for separating the flesh of fish from the skin and bones thereof, the combination of a travelling perforated septum, means for pressing the fish against said septum, comprising plungers having stems, means for reciprocating said plungers comprising a suitably guided box-like cross head in opposite sides of which the stems of said plungers are guided, a compression spring tending to project each plunger from the cross head toward the septum, and means for reciprocating said cross head.

6. In means for separating the flesh of fish from the skin and bones thereof, the combination of a travelling perforated septum, a cross head and means for causing said cross head to reciprocate toward and from said septum, a plurality of plungers independently yieldably mounted in said cross head, the sides of the heads of adjacent plungers being in substantial contact whereby to provide a presser surface composed of a plurality of areas adapted to yield independently.

7. In means for separating the flesh of fish from the skin and bones thereof, the combination of a travelling perforated septum, means cooperating with the septum for pressing the flesh through the perforations thereof, and feeding means for positively advancing fish between the septum and the pressing means.

8. In means for separating the flesh of fish from the skin and bones thereof, the combination of a travelling perforated septum, means cooperating with the septum for pressing the fish through the perforations thereof, and feeding means comprising a roller spaced from the travelling septum and cooperating therewith to advance the fish beneath the pressing means.

9. In a separating mechanism of the class described, the combination of a perforated septum, a presser means, means for moving said presser means toward and from said septum, and spring connections disposed between said presser means and the means for moving it whereby the presser means may force the material to be separated against the septum with a yielding pressure.

10. In a separating mechanism of the class described, the combination of a perforated septum, of a relatively movable presser means cooperating therewith, said presser means comprising a surface composed of a plurality of independently yieldable sections.

11. A separating mechanism of the class described, comprising a base, a flat rotatable perforated septum mounted thereon, the upper surface of said septum being substantially flush with the upper surface of the base, a presser means cooperating with said septum, means for supporting said presser means at one side of the axis of said septum leaving a portion of the surface thereof unobstructed to permit ready removal of material not pressed through the perforations of the septum by the presser means.

In testimony whereof I affix my signature.

JAMES J. BARRY.